Sept. 20, 1927.　　　　　　　　　　　　　　　　　　　1,642,848
F. G. FOLBERTH ET AL
INDICATOR FOR LOW LIQUID LEVELS
Filed April 7, 1922

Patented Sept. 20, 1927.

1,642,848

UNITED STATES PATENT OFFICE.

FREDERICK G. FOLBERTH AND WILLIAM M. FOLBERTH, OF CLEVELAND, OHIO.

INDICATOR FOR LOW LIQUID LEVELS.

Application filed April 7, 1922. Serial No. 550,428.

The invention is more particularly directed to means for operating an audible signal when the liquid has reached a predetermined level in a supply tank, such, for example, as a supply tank for a liquid fuel operated motor of an automobile or other motor operated conveyance.

The invention is particularly adaptable for use on automobiles or other motor operated conveyances as boats and aeroplanes, and will be described as applied in connection with a liquid fuel operated motor therefor. It often happens that the driver of an automobile or other conveyance exhausts the liquid fuel from his supply tank unexpectedly at a point remote from a source of fuel supply and is unable to further operate the motor until a fresh supply of fuel can be obtained, and the purpose of the invention is to provide an efficient warning device to indicate the exhaustion of the fuel supply in the supply tank.

The primary object of the invention is to provide an audible signal in the fuel line of a vacuum feed liquid fuel system for a motor intermediate the fuel supply tank and the motor, of such construction that when the fuel ceases to flow from the fuel supply tank to the motor the signal will be sounded by the operation of the motor, thereby notifying the operator of the motor that the fuel in the supply tank has been exhausted and that he has only the fuel in the vacuum tank remaining to run his motor to a fuel supply station or other point to obtain a fresh supply of fuel.

A further object of the invention is to provide such a device of the simplest construction possible and one than can be readily and quickly installed in the fuel line of a vacuum feed liquid fuel system.

A still further object of the invention is to provide a device of the character stated that will not be liable to get out of order and one that is protected from all dust, grease or other foreign substances that might collect therein and interfere with its perfect operation.

A further object of the invention is to provide an audible signal in a fuel line, the signal forming a part of the fuel line and so constructed as to be automatically sounded when the fuel fails to pass through the line.

A further object of the invention is to provide an alarm in the fuel line intermediate the fuel supply tank and the vacuum tank that will be sounded by the operation of the motor the instant the supply of fuel in the fuel supply tank is exhausted, thereby putting the operator of the motor on notice that he has only the fuel remaining in the vacuum tank for further operation of the motor.

A further object of the invention is to provide a device of the character stated, which will be simple in construction, economical of manufacture, and one that can be readily and quickly installed in the fuel line of a vacuum feed liquid fuel system.

Other objects of the invention will appear from the following description, which is directed to the preferred embodiment thereof, reference being had to the accompanying drawing which forms a part of the specification, the features of novelty being pointed out more particularly in the appended claims.

In the drawing, Fig. 1 is a schematic view showing the intake manifold of an internal combustion engine with the carburetor of the engine interposed in the fuel line between the intake and the gasoline supply tank of an automobile.

Like reference characters designate like parts throughout the drawings.

Figure 1:
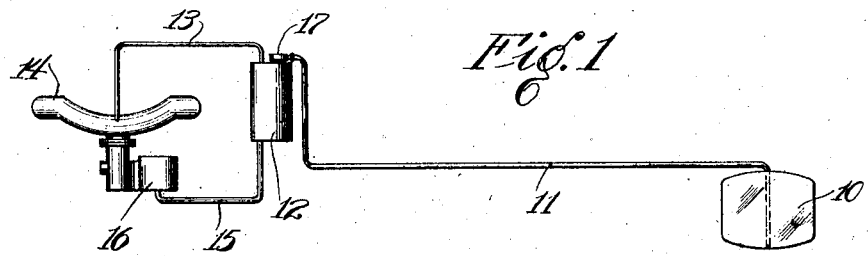
Figure 2:
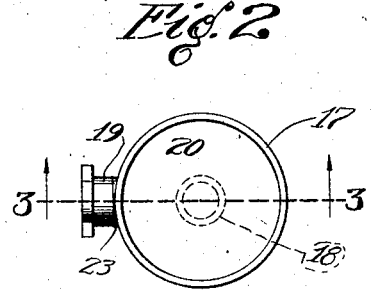
Fig. 2 is a top plan view of the housing for the audible signal with the signal installed therein.
Figure 3:
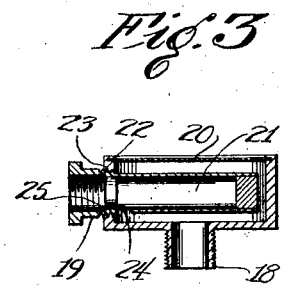
Fig. 3 is a vertical sectional view taken on line 3—3 of Fig. 2.

Reference character 10 designates a liquid fuel supply tank which may be, but not necessarily so, carried at the rear of an automobile. 11 designates the liquid fuel line from the tank 10 to the vacuum tank 12. Pipe 13 connecting the top of vacuum tank 12 with intake manifold 14 is for the purpose of forming a vacuum in the fuel line. Pipe 15 leading from the bottom of tank 12 to carburetor 16 is for the flow of the liquid fuel from vacuum tank 12 to carburetor 16 by gravity, as is usual in structures of this kind.

All of the foregoing described structure is old and forms no part of the invention.

The audible signal embodying the invention comprises a housing 17 preferably in the shape of a drum, although it may be of any shape desired. Externally screw threaded tubular member 18 is provided on the bottom of the housing for engaging the top or cap of vacuum tank 12 and internally screw threaded tubular member 19 is provided on the periphery of the housing for screw threaded engagement with fuel line 11. The top wall 20 of housing 17 is preferably made of a thin yieldable metal, thereby forming a sound transmitter in order that the sounding of the alarm device may be noticeable at the greatest possible distance. Tubular whistle 21, which is externally screw threaded, as at 22 for engagement with the internally screw threaded aperture 23 of housing 17, is inserted within housing 17 and in screw threaded engagement therewith, with the notch 24 and bypass 25 of the whistle turned downwardly in order that the liquid fuel drawn from fuel tank 10 into the whistle may drain into vacuum tank 12 so that the whistle may be free of any liquid when the fuel supply tank 10 is exhausted, at which time air will be drawn from the fuel tank 10 into the vacuum tank 12 by the operation of the cylinders of the motor, thereby sounding the whistle 21 in a well known manner.

From the foregoing disclosure, it will be obvious that as long as there is any liquid fuel within the supply tank 10 it will be drawn into vacuum tank 12 by the vacuum formed in the fuel line through the operation of the motor preventing the sounding of the whistle by the passage therethrough of the liquid fuel, and it will also be obvious that when the liquid fuel in tank 10 has been exhausted, that a current of air will be drawn through the fuel line and the whistle 21 by the suction of the cylinders of the motor, thus causing the sounding of the whistle. The device as disclosed is exceedingly simple in construction, economical of manufacture, practically indestructible, and highly efficient in its operation.

In order that the invention might be understood, we have shown the details of the preferred embodiment of our invention, but it is not desired to be limited to the mere details of construction, for it will be apparent that persons skilled in the art may resort to various modifications without departing from the purpose and spirit of the invention.

What we claim is:

1. In a vacuum fuel supply system for liquid fuel operated motors, a fuel supply tank, a vacuum tank spaced from the supply tank, a fuel line connecting the supply tank and the vacuum tank, and a signal device interposed in the fuel line between the supply tank and the vacuum tank comprising a housing having therein means adapted to silently permit the passage of liquid fuel therethrough, said means being also adapted to produce an audible sound upon the passage of air therethrough due to the failure of the fuel in the supply tank.

2. A signalling device for liquid fuel operated motors consisting of a hollow casing having inlet and outlet ports adapting the said casing for insertion in the supply line between the usual fuel supply tank and a vacuum fuel feeding device, and means within the said hollow casing in communication with said inlet and outlet ports adapted to silently permit the passage of liquid fuel therethrough between said ports said means being also adapted to produce an audible sound upon the passage of air therethrough due to the failure of the liquid fuel in the supply tank.

3. A signalling device for liquid fuel operated motors consisting of a hollow casing having inlet and outlet ports adapting the said casing for insertion in the supply line between the usual fuel supply tank and a vacuum fuel feeding device, and means within the said hollow casing in communication with said inlet and outlet ports adapted to silently permit the passage of liquid fuel therethrough between said ports and being also adapted to produce an audible sound upon the passage of air therethrough due to the failure of the liquid fuel in the supply tank, said means consisting of a tubular member closed at one end and connected at its other end to have communication with the port of the casing leading to the supply tank, there being a slot in the wall of the tubular member to cause vibration of air passing therethrough.

4. A signalling device for liquid fuel operated motors consisting of a hollow casing having inlet and outlet ports adapting the said casing for insertion in the supply line between the usual fuel supply tank and a vacuum fuel feeding device, and means within the said hollow casing in communication with said inlet and outlet ports adapted to silently permit the passage of liquid fuel therethrough between said ports and being also adapted to produce an audible sound upon the passage of air therethrough due to the failure of the liquid fuel in the supply tank, one of the walls of said casing being formed of relatively thin material whereby to impart to the surrounding air vibrations set up on the interior of the hollow casing.

5. An article of manufacture consisting of a hollow casing having a portion of its outer wall formed of relatively thin imperforate flexible material and being provided with inlet and outlet ports, there being a sound emitting device of a character adapted to silently permit the passage of liquid through the casing, said sound emitting device being located wholly within the casing and being adapted to emit a vibratory or whistling sound transmissible through said thin imperforate flexible material upon the passage of air through the casing.

6. An article of manufacture consisting of a hollow casing having a portion of its outer wall formed of relatively thin flexible material and being provided with inlet and outlet ports, there being a sound emitting device located wholly within the casing and consisting of a tubular member closed at one end and connected at its other end with one of the said ports, there being a perforation through the wall of the tubular member.

7. An article of manufacture consisting of a hollow casing having a portion of its outer wall formed of relatively thin flexible material and being provided with inlet and outlet ports, there being a sound emitting device located wholly within the casing and consisting of a tubular member closed at one end and connected at its other end with one of the said ports, there being a perforation through the wall of the tubular member on the side thereof adjacent the other of said ports.

8. An article of manufacture consisting of a hollow casing of cylindrical form, the tubular side wall thereof and one end wall being perforated to provide inlet and outlet ports of the casing, the said casing being formed with one end normally open, a relatively thin flexible diaphragm forming a closure for the said open end of the casing, and an air operated whistle inside of the casing in communication with one of said ports.

In testimony whereof we have signed our names to this specification on this 31st day of March, A. D. 1922.

FREDERICK G. FOLBERTH.
WILLIAM M. FOLBERTH.